United States Patent Office 2,977,967
Patented Apr. 4, 1961

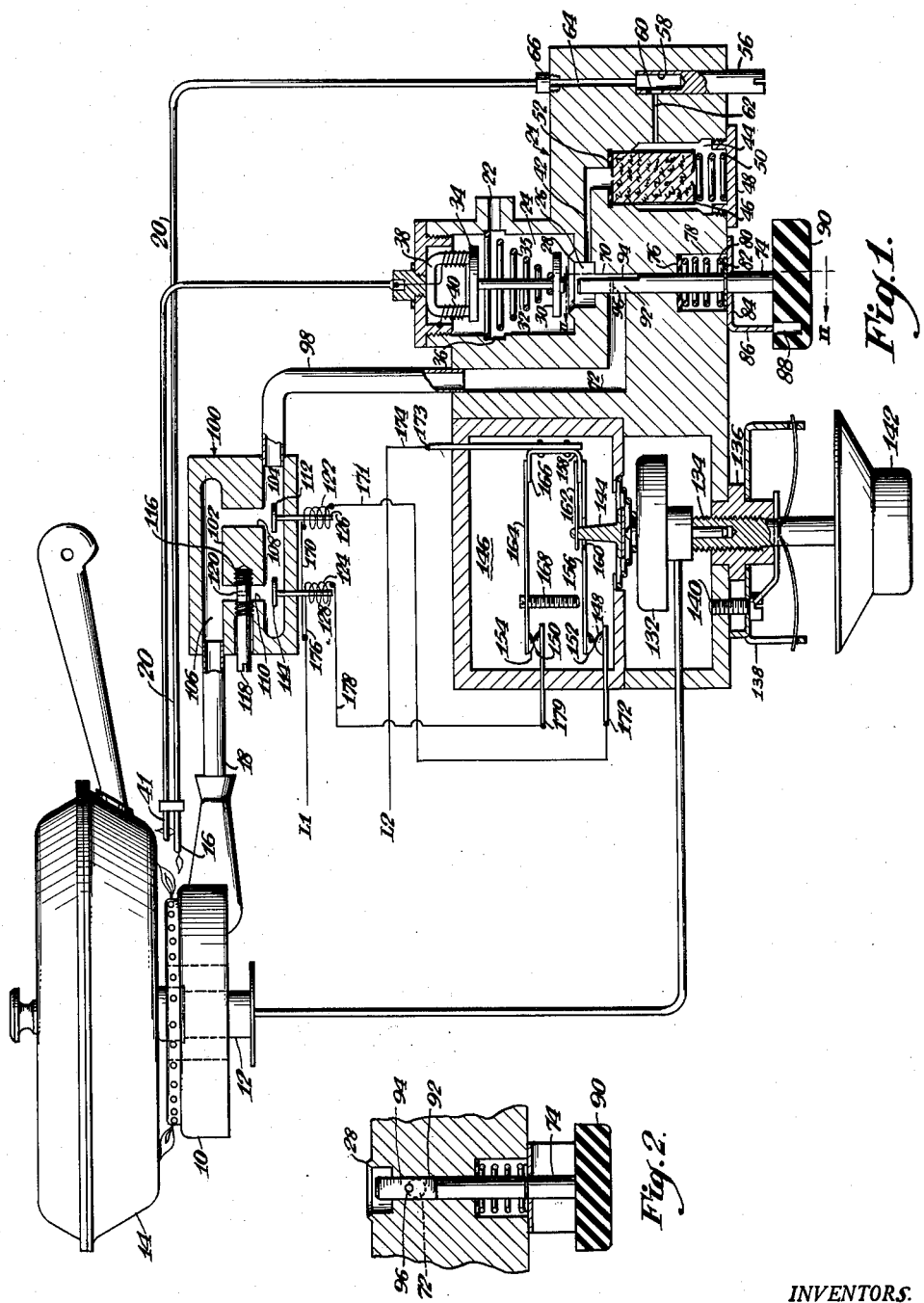

2,977,967

BURNER CONTROL APPARATUS

Victor Weber, Greensburg, William J. Russell, Jeannette, and William J. Sanders, Mount Pleasant, Pa., assignors to Robertshaw-Fulton Controls Company, Richmond, Va., a corporation of Delaware Filed Apr. 5, 1957, Ser. No. 650,977

8 Claims. (Cl. 137—66)

This invention relates to improvements in control mechanisms for regulating the flow of fuel to a heating unit, and more particularly to a thermostatically controlled and thermomagnetically piloted device.

In the control of many modern surface heating units of cooking ranges, a push-button is depressed to provide a flow of fuel to a pilot burner where it may be ignited and a thermocouple, responsive to a flame at the pilot burner, energizes an electromagnet. A valve member associated with the armature of the electromagnet is movable therewith to an open position. Manual operation of a shut-off cock, separately and independently of the push-button resetting operation, causes a flow of fuel to the main burner and a thermostatically controlled dual solenoid valve unit, positioned between the gas cock and the main burner, supplies a flow of fuel thereto in accordance with the predetermined setting of a temperature dial associated with the thermostatic unit. In addition, a thermally responsive unit acting in accordance with the setting of the temperature dial controls the operation of the dual solenoid valve unit whereby the flow of fuel to the main burner is regulated in accordance with the temperature of the substance being heated.

An object of this invention is to adjust initially the size of the flame of the main burner of a cooking range to suit the size of a utensil placed thereon.

Another object of this invention is to regulate a flow of fuel to the main burner of a heating appliance having a thermostatic control without changing the thermostatic features of such control.

A further object of this invention is to integrate the actuating means for supplying fuel to the main burner of a heating appliance with the actuating means for supplying fuel to its pilot burner.

It is another object of this invention to filter and adjust a flow of fuel to the pilot burner of a heating appliance.

Another object of this invention is to combine the actuating means for supplying fuel to the burners of a heating appliance with a throttling device for controlling and regulating a flow of fuel to the burners.

Other objects and advantages will become apparent from the following description taken in connection with the accompanying drawing wherein:

Fig. 1 is a schematic view of a control system for a fuel burner embodying this invention, portions thereof being shown in section; and Fig. 2 is a sectional view taken on line 2—2 of Fig. 1.

Referring to Fig. 1, there is shown an annular surface heating main burner 10 supported on the top plate of a gas range (not shown) in a manner well known in the art. Burner 10 is provided with the usual opening in the center thereof for accommodating a temperature sensing element 12 which engages the undersurface of a cooking vessel 14. A pilot burner 16 is positioned in close proximity to the main burner 10. A flow of fuel is conducted to main burner 10 by a conduit 18 while a flow of fuel is conducted to the pilot burner 16 by a conduit 20.

Fuel is supplied from a main source to a main control casing 21 through an inlet port 22 which communicates with an inlet chamber 24 leading to an outlet chamber 26. Chambers 24 and 26 are separated by an annular valve seat 28 and a cooperating valve member 30. The valve member 30 is provided with a stem 32 which carries an armature 34 on its opposite end. A helical coil spring 35 is operative between valve member 30 and an annular indentation 36 provided in the wall of the casing 21 and normally biases the valve member 30 to a closed position in engagement with valve seat 28.

The armature 34 forms part of an electromagnetic means and is adapted for movement between attracted and released positions relative to the pole faces of a horseshoe magnet 38 according to the energization or deenergization respectively of a winding 40 associated with magnet 38. Due to the provision of coil spring 35, armature 34 is biased to its released position and resetting means to be described hereinafter are employed to place it in its attracted position. The winding 40 is energized by thermoelectric current generated by a thermocouple 41 which is electrically connected to winding 40 and is so located as to be heated by a flame at the pilot burner 16. It is to be understood that the energy so generated is insufficient to attract the armature 34 from its released position but is sufficient to retain it in the attracted position upon completion of the resetting operation.

Outlet chamber 26 is provided with a pilot outlet passage 42 leading perpendicularly from its wall to a filter cavity 44. A filter 46 is positioned in cavity 44 and is adjusted by means of sealing cap 48 which holds filter 46 by a coil spring 50 positioned between filter 46 and screw 48. Filter 46 is easily serviced or replaced by removal of coil spring 50 and adjusting screw 48 which is accessible on the outside of casing 21. The inlet side of the filter 46 is provided with a seal 52 to prevent a flow of any unfiltered fuel through the passage 42 to chamber 44. A passage 62 leads from filter cavity 44 and a pilot adjusting screw 56 has an outer end protruding outside of casing 21 and an inner end which is hollowed out to define a chamber 58. An aperture 60 in the wall of chamber 58 communicates with a passage 62 leading from filter cavity 44. Chamber 58 communicates with a passage 64 leading to a pilot outlet port 66 which is connected to pilot burner conduit 20. Manipulation of pilot adjusting screw 56 on the outside of casing 21 provides a ready means for adjusting the flame at pilot burner 16 to suit various conditions and installations.

Chamber 26 is provided with a main outlet passage 70 which extends from the bottom thereof to a main outlet port 72. A cylindrical flow regulating rod 74 is longitudinally disposed in passage 70 with its inner end extending into chamber 26 adjacent the valve member 30 and with its outer end protruding exteriorly of casing 21 at the end opposite the magnet 38. A sealing gasket 76 surrounding rod 74 and fitting into a mounting recess 78 in casing 21 is held in place by a coil spring 80. A spring retaining washer 82, spaced axially outwardly from gasket 76, is mounted on rod 74 for axial movement therewith. The rod mounting assembly comprising gasket 76, spring 80, and retainer 82 is held in place by a cover plate 84 which surrounds the rod 70 and is rigidly affixed to the exterior of the casing 21. The tang 86 is bent perpendicularly from the plate 84 in alignment with a channel 88 provided in the undersurface of a control knob 90 which is rigidly mounted on the outer end of rod 74.

The inner portion of rod 74 acts as a shut-off cock to control the flow of fuel from the passage 70 to the main outlet port 72 and is provided with throttling means to regulate such flow. The throttling means, extending from the inner end of rod 74 outwardly to a portion on rod 74 which is just beyond the outlet port 72, has an arcuate surface 92 joined by a flattened surface 94 to form a substantially D-shaped cross-section. As is illustrated in the drawing, the arcuate surface of the D-formation has a close fit with the wall of passage 70, while the flat surface 94 of the D-formation extends across passage 70 on a chord to form a clearance therebetween.

The throttling means is provided with a restricting aperture 96 whose longitudinal axis is perpendicular to the flat surface 94 of the D-formation. Aperture 96 provides a communicating orifice between the main outlet port 72 and the clearance formed by flat surface 94 and passage 70. A conduit 98 connects the main outlet port 72 of the casing 21 with a dual solenoid valve housing, indicated generally at 100, which in turn is connected to the main burner conduit 18. The interior of housing 100 is provided with a partition 102 which separates the inlet chamber 104 from the outlet chamber 106. The partition 102 is provided with a pair of spaced openings 108 and 110 which establish communication from inlet chamber 104 to outlet chamber 106 which is connected to main burner conduit 18. Flow of fuel through the openings 108 and 110 is controlled by valve members 112 and 114, respectively. A tapped bore 116 formed in housing 100 extends through partition 102 on an axis which transversely intersects the longitudinal axis of opening 110. An adjusting rod 118 is threadedly received in tapped bore 116 and is provided with a passageway 120. Rotation of rod 118 regulates the flow of fuel through opening 110 from a maximum flow condition when the longitudinal axis of passageway 120 is aligned with the longitudinal axis of opening 110 to a zero flow condition when passageway 120 is perpendicularly disposed to the longitudinal axis of opening 110. Valve members 112 and 114 are normally biased to a closed position by coil springs (not shown) in a manner well known in the art. Actuation of valves 112 and 114 is accomplished by a pair of solenoids comprising coils 122 and 124, and armature 126 and 128, respectively. As is illustrated in the drawing, armatures 126 and 128 are connected to valve members 112 and 114, respectively; coils 122 and 124 control the actuation of their respective armatures in accordance with the demands of a thermostatically controlled switch.

A capillary tube 130, connected to a temperature sensing element 12, communicates with an expansible power element 132 in a manner well known in the art. One side of power element 132 is supported by stud 134 which is threaded through a suitable aperture formed in a boss 136 which is rigidly clamped to casing 21 by any suitable means such as retaining assembly 138 and set screw 140. One end of stud 134 projects outside the casing 21 and carries a manually operable dial 142 which may be manipulated to rotate the stud 134 and thus effect axial adjustment of the power element 132 relative to the casing 21. The sensing element 12, capillary tube 130 and power element 132 comprise a closed system filled with an expansible substance so that a variation of temperature sensed by the sensing element 12 produces a corresponding expansion or contraction of power element 132.

A thrust button 144 is carried on the opposite side of power element 132 and projects into a switch chamber 146. Disposed within switch chamber 146 is a pair of spaced superposed fixed contacts 148, 150 which are engageable respectively by a pair of movable contacts 152, 154. Movable contact 152 is carried on the free end of a switch arm 156 and the opposite end thereof is attached to and pivoted by an arm 158 of a flexure plate secured to a wall of chamber 146 by any suitable means. Thrust button 144 protrudes through an aperture 160 intermediately disposed between the ends of switch arm 156 and is affixed to one end of a bimetal strip 162 whose opposite end is fixed to flexure plate arm 158 adjacent the fixed end of switch arm 156. Flexure plate arm 158 serves to bias the switch arm 156 in a counterclockwise direction, as viewed in the drawing, and thus bias the movable contact 152 towards the stationary contact 148. The movable contact 154 is carried on the free end of a switch arm 164 and the opposite end thereof is attached to and pivoted by an arm 166 of the flexure plate. Flexure plate arm 166 serves to bias switch arm 164 in a counterclockwise direction to bias movable contact 154 toward stationary contact 150. Switch arm 164 is provided with adjustable abutment means in the form of a screw 168 threaded through the switch arm 164 and extending towards the switch arm 156.

The electrical connections and wiring diagram for the various parts of the control system will be described in connection with the sequence of operation of the control device which follows.

Operation

To prepare the control device for operation, dial 142 is rotated to a desired temperature setting causing stud 134 to move axially out of boss 136 and casing 21. Power element 132, projection 144 and the attached bimetal element 162 are likewise moved so that movable contacts 152 and 154 engage fixed contacts 148 and 150, respectively. Element 162 is in the form of a bimetal in order to compensate for high ambient temperatures that may surround the switch chamber 146. The apparatus is thus conditioned to supply electrical energy to solenoid coil 122 through a circuit which may be traced as follows: from line wire L1 of a suitable two line power source through wire 170, solenoid coil 122, wire 171, terminal 172, fixed contact 148, movable contact 152, switch arm 156, terminal 173, and wire 174 to line wire L2. Similarly, electrical energy is supplied to coil 124 through a parallel circuit which may be traced as follows: from line wire L1 through wire 176, solenoid coil 124, wire 178, terminal 179, fixed contact 150, movable contact 154, switch arm 164, terminal 173, and wire 174 to line wire L2. Energization of the coils 122 and 124 attracts armatures 126 and 128, respectively, to move valve members 112 and 114, respectively, to their open positions against the bias of their respective springs (not shown).

To ignite the pilot burner, the flow regulator dial 90 is rotated to the "low" position and pushed inwardly. As is illustrated in the drawing, dial 90 must be in the "low" position in order that tang 86 is in alignment with channel 88. In any other dial position, channel 88 would not line up with tang 86 and if the dial 90 were depressed, the tang 86 would bear against the undersurface of dial 90 before the valve member 30 was moved to an open position. When dial 90 is depressed, the inner end of flow regulating rod 74 is projected into the inlet valve chamber 24 to move the valve member 30 to an open position against the bias of coil spring 35 causing the armature 34 to contact electromagnet 38. This establishes a pilot fuel path as follows: from any suitable source (not shown) through inlet port 22, chamber 24, valve seat 28, chamber 26, passage 42, pilot filter 52, pilot filter cavity 44, passage 62, aperture 60, pilot adjusting screw 56, passage 64, pilot outlet port 66, conduit 20, to pilot burner 16. A flame at the pilot burner 16 is established by any suitable means such as a lighted match. Thermocouple 41 becomes heated by the flame at pilot burner 16, thus energizing the winding 40 sufficiently to retain armature 34 in its attracted position.

While in its depressed position, flow regulating rod 74 is displaced axially relative to the main outlet port 72, thus preventing fuel flow to the main burner. Upon release of dial 90, flow regulator rod is moved axially outwardly under the bias of coil spring 80 to its position illustrated in the drawing; aperture 96 is now aligned with main outlet port 72 establishing a minimum flow condition of fuel to main burner 10. To adjust the size of the flame at the main burner 10 to suit the size of a utensil 14 placed thereon, fuel flow to outlet port 72 is throttled by rotating the dial 90. By such rotation, the arcuate surface 92 of the D-formation is caused to overlie partially the end of main outlet port 72 to throttle the same. Continued rotation of the rod 74 places the flattened surface 94 of the D-formation adjacent main outlet port 72 thus providing a maximum flow condition.

With both solenoid valves open, the fuel flow path is now complete to the main burner and the amount of fuel flowing thereto is initially dictated by the throttling means of the flow regulating rod 74. This feature provides rapid heat up regardless of utensil size, since the size of the flame can be adjusted to suit the size of the utensil. As the temperature of the cooking utensil 14 increases, the sensing element 12 and capillary tube 130 causes expansion of the power element 132. As the desired temperature setting is approached, power element 132 expands sufficiently to move projection 144 and its attached bimetal strip 162 causing switch arm 156 to pivot in a clockwise direction against the bias of its flexure plate arm 158 and thereby move contact 152 out of engagement with fixed contact 148.

Opening of contacts 148, 152 breaks the electrical circuit for solenoid coil 122 causing the closing of valve member 112. At this stage of the operation, the contacts 150, 154 are still in engagement and solenoid coil 124 continues to be energized to maintain valve member 114 in an open position resulting in continued heating of utensil 14 at a slower rate.

As the temperature of the cooking vessel 14 increases due to the reduced flow of fuel through restricted passageway 120 in communication with opening 110, the temperature rise sensed by the sensing element 12 causes the continued expansion of power element 132. When the desired temperature initially set by dial 142 is reached, the resulting movement of projection 144 and bimetal element 162 closes the gap between abutment screw 168 and switch arm 156, exerting a force on switch arm 164 to pivot the same in a clockwise direction against the bias of flexure plate arm 166 and thereby move contact 154 out of engagement with fixed contact 150.

Opening of contacts 150, 154 breaks the electrical circuit for solenoid coil 124 causing the closing of valve member 114. This action shuts off all fuel supplied to main burner 10 and further heating of utensil 14 is temporarily discontinued.

It will be apparent that if the temperature of utensil 12 remains at or above the desired temperature setting, the power element 132 will remain sufficiently expanded to maintain switch arm 164 in a position which separates contacts 150, 154 so that both solenoid coils 122, 124 will remain de-energized and fuel supply to main burner 10 is prevented. As the contents of utensil 14 cool, this reaction is transmitted by the sensing element 12 to the power element 132, which contracts to permit switch arms 156 and 164 to pivot counterclockwise under the bias of their respective flexure plate arms 158 and 166. Movement of switch arm 164 causes engagement of contacts 150, 154 to complete once again the above described circuit for solenoid coil 124 whereby valve member 114 is moved to an open position and fuel is supplied through restricted passageway 120 to main burner 10 at a reduced rate. Main burner 10 will thus be cycled by the repeated energization and de-energization of solenoid coil 124 in accordance with the temperature demands of utensil 14.

If the temperature of utensil 14 decreases sufficiently below the desired temperature setting, or in the event that the reduced heat input is insufficient to restore the desired temperature, power element 132 contracts further permitting the continued counterclockwise movement of switch arm 156 under the bias of its flexure plate arm 158. The continued movement of switch arm 156 causes the engagement of contacts 148, 152 to complete once again the above described circuit for solenoid coil 122 whereby valve member 112 is moved to an open position and fuel is supplied to main burner 10 at its predetermined rate. The opening and closing of valves 122 and 124 in response to the temperature of the contents of utensil 14 continues until the cooking cycle is completed.

It is to be understood that the amount of fuel controlled by solenoid valve housing 100 is limited by the amount of fuel initially supplied by adjustment of flow regulating rod 74 in passage 70. In other words, when both valve members 112 and 114 are each in an open position, the amount of fuel flowing through the same will be equal to that flowing from main outlet port 72; when valve member 112 is closed, the flow of fuel through valve member 114 will be reduced with respect to the flow of fuel that could flow from main outlet port 72.

If at any time the pilot flame is extinguished, the magnet winding 40 becomes de-energized so that armature 34, stem 32, and valve member 30 are moved under the bias of coil spring 35. Valve member 30 is retained in engagement with valve seat 28 by coil spring 35 to shut off all fuel flow to both main burner 10 and pilot burner 16. Before the cooking cycle can be continued, dial 90 must be rotated to the "low" position and depressed to reset armature 34 in contact with electromagnet 38. After the resetting operation, the sequence of operation proceeds according to the above description.

Only one embodiment of the invention has been herein shown and described and inasmuch as this invention is subject to many variations and modifications, it is intended that all matter contained in the above description of the embodiment shown and described shall be interpreted as illustrative and not in a limiting sense.

It is claimed and desired to secure by Letters Patent:

1. In a fluid flow control device, the combination of a control casing having an inlet and an outlet with connecting passage means therebetween for fluid flow through said casing, control means movable between operative positions in said casing for controlling said fluid flow and being biased to one of said positions, means for retaining said control means in another said position, and reset means operatively engageable with said control means for moving said control means toward said other position, said reset means including a stem portion coacting with said passage means and biased toward an inoperative position relative to said control means but being operable in said position for adjusting said fluid flow.

2. In a fluid flow control device, the combination of a control casing having an inlet and an outlet with connecting passage means therebetween for fluid flow through said casing, control means movable axially between operative positions in said casing for controlling said fluid flow and being biased to one of said positions, means for retaining said control means in another said position, and reset means mounted for axial and rotatable movement in said casing and being operatively engageable with said control means upon said axial movement for moving said control means toward said other position, said reset means including a stem portion coacting with said passage means and biased axially toward an inoperative position relative to said control means but being rotatable in said position for adjusting said fluid flow.

3. In a fluid flow control device, the combination of a control casing having an inlet and an outlet with connecting passage means therebetween for fluid flow through said casing, control means movable axially between operative positions in said casing for controlling said fluid flow and being biased to one of said positions, means for retaining said control means in another said position, and reset means mounted for axial and rotatable movement in said casing and being operatively engageable with said control means upon said axial movement for moving said control means toward said other position, said reset means including a stem portion coacting with said passage means and biased axially toward an inoperative position relative to said control means, said stem portion having a restricted orifice therein adapted for registry with said outlet in said inoperative position of said stem portion for restricting said fluid flow.

4. In a fluid flow control device, the combination of a control casing having an inlet and an outlet with connecting passage means therebetween for fluid flow through said casing, said passage means being intersected by a cylindrical wall chamber, control means movable between operative positions in said casing for controlling said fluid flow and being biased to one of said positions, means for retaining said control means in another said position, and reset means operatively engageable with said control means for moving said control means toward said other position, said reset means including a stem portion extending into said chamber and biased toward an inoperative position relative to said control means, said stem portion having a non-circular cross-section element cooperable with said wall and being operable in said inoperative position for adjusting said fluid flow.

5. In a fluid flow control device, the combination of a control casing having an inlet and an outlet with connecting passage means therebetween for fluid flow through said casing, said passage means being intersected by a cylindrical wall chamber, control means movable axially between operative positions in said casing for controlling said fluid flow and being biased to one of said positions, means for retaining said control means in another said position, and reset means mounted for axial and rotatable movement in said casing and being operatively engageable with said control means upon said axial movement for moving said control means toward said other position, said reset means including a stem portion extending into said chamber and biased axially toward an inoperative position relative to said control means, said stem portion having a non-circular cross-section element cooperable with said wall and having a restricted orifice therein, said orifice being adapted for registry with said outlet in said inoperative position of said stem portion for restricting said fluid flow, said element being rotatable with said stem portion in said position for adjusting said fluid flow.

6. In a fluid flow control device, the combination of a control casing having an inlet and an outlet with connecting passage means therebetween for fluid flow through said casing, said passage means being intersected by a cylindrical wall chamber, said casing having a pilot passage intermediate said inlet and outlet, control means movable axially between operative positions in said casing for controlling fluid flow to said outlet and said pilot passage and being biased to one of said positions, means for retaining said control means in another said position, reset means mounted for axial and rotatable movement in said casing and being operatively engageable with said control means upon said axial movement to conduct a resetting operation for moving said control means toward said other position, said reset means including a stem portion extending into said chamber and biased axially toward an inoperative position relative to said control means, said stem portion having a non-circular cross-section element cooperable within said wall, said element being rotatable with said stem portion in said inoperative position for adjusting said fluid flow from said inlet to said outlet, and means cooperable with said reset means for preventing said fluid flow between said inlet and said outlet during the resetting operation except to said pilot passage.

7. In a control device for a heating appliance having a main burner and a pilot burner, the combination comprising a casing, said casing including means forming an inlet chamber and an outlet chamber within said casing, a valve member disposed within said inlet chamber and being operative between open and closed positions to control a flow of fuel from said inlet chamber to said outlet chamber, means to bias said valve member to its closed position, means adapted to be responsive to a flame at the pilot burner to retain said valve member in its open position, means defining a pilot outlet passage in said casing communicating with said outlet chamber, means defining a pilot outlet port in said casing communicating with said pilot outlet passage, means defining a main outlet passage in said casing displaced from said pilot outlet passage and communicating with said outlet chamber, means defining a main outlet port in said casing communicating with said main outlet passage, a rod having an inner portion disposed in said main outlet passage and extending into said outlet chamber and an outer portion protruding exteriorly of said casing, said inner portion of said rod being formed with flow regulating means provided with a restricting orifice adapted to communicate with said main outlet port, and control means on the outer portion of said rod operable in one direction to impart rotary motion to said rod and being independently operable in another direction to impart axial motion to said rod, the rotary motion causing said flow regulating means to regulate the flow of fuel to said main outlet port, the axial motion causing the inner portion of said rod to extend into said inlet chamber and move said valve member to its open position in opposition to its biasing means and causing displacement of said restricting orifice relative to said main outlet port.

8. The combination as recited in claim 7, wherein said flow regulating means comprises a flat surface joined by an arcuate surface providing the inner portion of said rod with a substantially D-shaped cross-section.

References Cited in the file of this patent
UNITED STATES PATENTS

| | | |
|---|---|---|
| 2,048,162 | Kriechbaum | July 21, 1936 |
| 2,213,844 | Mantz | Sept. 3, 1940 |
| 2,636,505 | Paille | Apr. 28, 1953 |
| 2,684,691 | Strickler | July 27, 1954 |
| 2,728,386 | Thornbery | Dec. 27, 1955 |
| 2,735,439 | Coffey | Feb. 21, 1956 |